United States Patent
Tomson et al.

(10) Patent No.: US 12,404,439 B2
(45) Date of Patent: Sep. 2, 2025

(54) EXTENDED RELEASE ASPHALTENE INHIBITOR COMPOSITION

(71) Applicant: CHAMPIONX LLC, Sugar Land, TX (US)

(72) Inventors: Ross Tomson, Sugar Land, TX (US); Paula Guraieb, Sugar Land, TX (US); Kristin Powell, Sugar Land, TX (US); Rangana Jayawickramage, Sugar Land, TX (US)

(73) Assignee: CHAMPIONX LLC, Sugar Land, TX (US)

( * ) Notice: Subject to any disclaimer, the term of this patent is extended or adjusted under 35 U.S.C. 154(b) by 0 days.

(21) Appl. No.: 18/550,515

(22) PCT Filed: Mar. 28, 2022

(86) PCT No.: PCT/IB2022/052856
§ 371 (c)(1),
(2) Date: Sep. 14, 2023

(87) PCT Pub. No.: WO2022/208322
PCT Pub. Date: Oct. 6, 2022

(65) Prior Publication Data
US 2024/0059948 A1     Feb. 22, 2024

Related U.S. Application Data

(60) Provisional application No. 63/167,445, filed on Mar. 29, 2021.

(51) Int. Cl.
*C09K 8/03* (2006.01)
*B82Y 30/00* (2011.01)
(Continued)

(52) U.S. Cl.
CPC ............... *C09K 8/03* (2013.01); *C09K 8/04* (2013.01); *B82Y 30/00* (2013.01); *B82Y 99/00* (2013.01); *C09K 2208/10* (2013.01)

(58) Field of Classification Search
CPC .... C09K 2208/10; C09K 8/524; C09K 8/035; C09K 8/58; C09K 8/03; C09K 8/536;
(Continued)

(56) References Cited

U.S. PATENT DOCUMENTS

| 4,414,035 A | 11/1983 | Newberry et al. |
| 5,089,150 A | 2/1992 | Hen |

(Continued)

FOREIGN PATENT DOCUMENTS

| CA | 2029465 | 5/1991 |
| CA | 2075749 | 2/1993 |

(Continued)

OTHER PUBLICATIONS

Bouts et al., "An Evaluation of New Asphaltene Inhibitors: Laboratory Study and Field Testing," J. Pet. Technol., Sep. 1995, 47:782-7.

(Continued)

*Primary Examiner* — Zakiya W Bates
(74) *Attorney, Agent, or Firm* — NORTON ROSE FULBRIGHT US LLP

(57) ABSTRACT

A nanoparticle for well-treatment applications and compositions and methods of making and using the same can include a carrier material and an asphaltene inhibitor. The asphaltene inhibitor is capable of being released from the carrier material. The nanoparticle can have a size of 10 nanometers (nm) to 500 nm.

19 Claims, 4 Drawing Sheets

(51) Int. Cl.
*B82Y 99/00* (2011.01)
*C09K 8/04* (2006.01)
*E21B 43/22* (2006.01)

(58) Field of Classification Search
CPC .......... C09K 8/46; C09K 8/62; E21B 47/005;
E21B 33/13; E21B 33/14; E21B 43/10;
E21B 43/26; E21B 43/267
See application file for complete search history.

(56) References Cited

U.S. PATENT DOCUMENTS

| | | | |
|---|---|---|---|
| 5,421,993 | A | 6/1995 | Hille et al. |
| 5,964,291 | A | 10/1999 | Bourne et al. |
| 6,180,683 | B1 | 1/2001 | Miller et al. |
| 6,693,071 | B2 | 2/2004 | Ghosh et al. |
| 7,422,759 | B2 | 9/2008 | Kepner et al. |
| 7,491,682 | B2 | 2/2009 | Gupta et al. |
| 7,493,955 | B2 | 2/2009 | Gupta et al. |
| 8,822,386 | B2 | 9/2014 | Quintero et al. |
| 9,155,310 | B2 | 10/2015 | Agrawal et al. |
| 9,921,205 | B2 | 3/2018 | Ovalles et al. |
| 9,926,485 | B2 | 3/2018 | Yan et al. |
| 10,266,750 | B2 | 4/2019 | Oghena et al. |
| 10,480,281 | B2 | 11/2019 | Al-Olayan et al. |
| 10,619,086 | B2 | 4/2020 | Yan et al. |
| 10,703,959 | B2 | 7/2020 | Mazyar et al. |
| 10,704,381 | B2 | 7/2020 | Cox |
| 11,028,313 | B2 | 6/2021 | Yan et al. |
| 11,597,866 | B2 | 3/2023 | Yan et al. |
| 2002/0127164 | A1 | 9/2002 | Liu et al. |
| 2004/0023824 | A1 | 2/2004 | Zueechner et al. |
| 2004/0039125 | A1 | 2/2004 | Breuer et al. |
| 2004/0050752 | A1 | 3/2004 | Leinweber et al. |
| 2004/0163995 | A1 | 8/2004 | Cornelisse |
| 2004/0232042 | A1 | 11/2004 | Mukkamala |
| 2004/0232043 | A1 | 11/2004 | Mukkamala |
| 2004/0232044 | A1 | 11/2004 | Mukkamala |
| 2004/0238404 | A1 | 12/2004 | Mukkamala |
| 2005/0082231 | A1 | 4/2005 | Gochin |
| 2005/0091915 | A1 | 5/2005 | Behler |
| 2006/0079434 | A1 | 4/2006 | Banavali et al. |
| 2006/0096757 | A1 | 5/2006 | Berry et al. |
| 2006/0096758 | A1 | 5/2006 | Berry et al. |
| 2008/0058229 | A1 | 3/2008 | Berkland et al. |
| 2008/0138538 | A1 | 6/2008 | Lewis et al. |
| 2009/0312201 | A1 | 12/2009 | Huang et al. |
| 2010/0314108 | A1 | 12/2010 | Crews et al. |
| 2012/0015852 | A1 | 1/2012 | Quintero et al. |
| 2013/0341028 | A1 | 12/2013 | Christian et al. |
| 2014/0338915 | A1 | 11/2014 | Ferm et al. |
| 2015/0027699 | A1 | 1/2015 | Loiseau et al. |
| 2017/0058185 | A1 | 3/2017 | Naumov et al. |
| 2017/0174978 | A1 | 6/2017 | Giro et al. |
| 2018/0298274 | A1 | 10/2018 | Zhao et al. |
| 2019/0177630 | A1 | 6/2019 | Nguyen et al. |
| 2021/0095318 | A1 | 4/2021 | Wang et al. |
| 2022/0145162 | A1 | 5/2022 | Tomson et al. |

FOREIGN PATENT DOCUMENTS

| | | |
|---|---|---|
| CA | 2326288 | 5/2001 |
| CN | 110550638 A | 12/2019 |
| CN | 112538145 A | 3/2021 |
| EP | 1091085 | 4/2001 |
| RU | 2172817 | 8/2001 |
| RU | 2173320 | 9/2001 |
| RU | 2185412 | 7/2002 |
| RU | 2220999 | 1/2004 |
| RU | 2223294 | 2/2004 |
| RU | 2237799 | 10/2004 |
| RU | 2250247 | 4/2005 |
| RU | 2261887 | 10/2005 |
| RU | 2261983 | 10/2005 |
| WO | WO 96/20698 | 7/1996 |
| WO | WO 01/25214 | 4/2001 |
| WO | WO 2001/074966 | 10/2001 |
| WO | WO 2004/033602 | 4/2004 |
| WO | WO 2005/010126 | 2/2005 |
| WO | WO 2005/054321 | 6/2005 |
| WO | WO 2006/047745 | 5/2006 |
| WO | WO 2008/030758 | 3/2008 |
| WO | WO 2010/081480 | 7/2010 |
| WO | WO 2012/009128 | 1/2012 |
| WO | WO 2012/148819 | 11/2012 |
| WO | WO 2012/154332 | 11/2012 |
| WO | WO 2016/174415 | 11/2016 |
| WO | WO 2017/208096 | 12/2017 |
| WO | WO 2018/140304 | 8/2018 |
| WO | WO 2019/199289 | 10/2019 |
| WO | WO 2020/205747 | 10/2020 |
| WO | WO 2022/208322 | 10/2022 |

OTHER PUBLICATIONS

Chang and Fogler, "Asphaltene Stabilization in Alkyl Solvents Using Oil-Soluble Amphiphiles," OnePetro, SPE-25185-MS, Mar. 1993.

Haghtalab et al., "Evaluation of the Effective Parameters in Synthesis of the Nano-Structured Scaling Inhibitors Applicable in Oil Fields with Sea Water Injection Process", Journal of Nanoparticle Research, 14, (2012), pp. 1210-1221.

PCT International Search Report and Written Opinion issued in Corresponding PCT Application No. PCT/US2020/025738, dated Jul. 29, 2020.

Kiaei et al., "Desalination 2014, 338, 84-92 Experimental Study of Using Ca-DTPMP Nanoparticles in Inhibition of CaCO3 Scaling in a Bulk Water Process", Desalination, 338, (2014), pp. 84-92.

PCT International Search Report and Written Opinion issued in International Application No. PCT/IB2022/052856, dated Jun. 24, 2022.

PCT International Search Report and Written Opinion issued in International Application No. PCT/US2023/075237, dated Jan. 19, 2024.

Shen et al., "Control Placement of Scale Inhibitors In The Formation With Stable Ca-DTPMP Nanoparticle Suspension and Its Transport In Porous Medium", Society of Petroleum Engineers, (2008).

Watanabe et al. "Synthesis of Nano-sized Boehmites for Optimum Phosphate Sorption", Separation Science and Technology, 46.5, (2011), pp. 818-824.

Yan et al., "Boehmite Based Sulphonated Polymer Nanoparticles with Improved Squeeze Performance for Deepwater Scale Control", Offshore Technology Conference, (2013).

Yan et al., "Synthesis and Size Control of Monodispersed Al-sulphonated C6 Polycarboxylic Acid (Al-SPCA) Nanoparticles with Improved Squeeze Performance and Their Transport in Porous Media", Society of Petroleum Engineers, (2012).

Yan et al., "Synthesis and Sorption Study of AlOOH Nanoparticle-Crosslinked Polymeric Scale Inhibitors and Their Improved Squeeze Performance in Porous Media", Offshore Technology Conference, (2013).

Zhang et al., "Enhanced transport of novel crystalline calcium-phosphonate scale cs inhibitor nanomaterials and their long term flow back performance in laboratory squeeze simulation tests", RSC Advances, 6, (2016), pp. 5259-5269.

Zhang et al., "Silica-Templated Synthesis of Novel Zinc-DTPMP Nanomaterials: Their C9 Transport in Carbonate and Sandstone Media During Scale Inhibition", Society of Petroleum Engineers, 19:3, (2011 ).

Zhang et al., "Surfactant-Assisted Synthesis of Metal-Phosphonate Inhibitor Nanoparticles and Transport in Porous Media", Society of Petroleum Engineers, 15:3, (2010).

Zhang et al., "Synthesis of Crystalline-Phase Silica-Based Calcium Phosphonate Nanomaterials and Their Transport in Carbonate and Sandstone Porous Media", Ind. Eng. Chem. Res., 50:4, (2011), pp. 1819-1830.

(56) References Cited

OTHER PUBLICATIONS

Office Action for EA Application No. 202392716, issued May 26, 2024, English translation.
Office Action issued in corresponding Eurasian Patent Application No. 202392716, dated Mar. 10, 2025. (English Translation Provided).

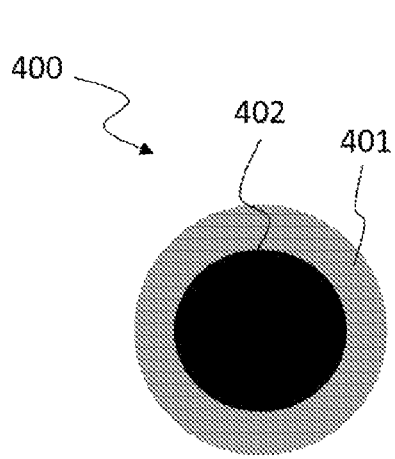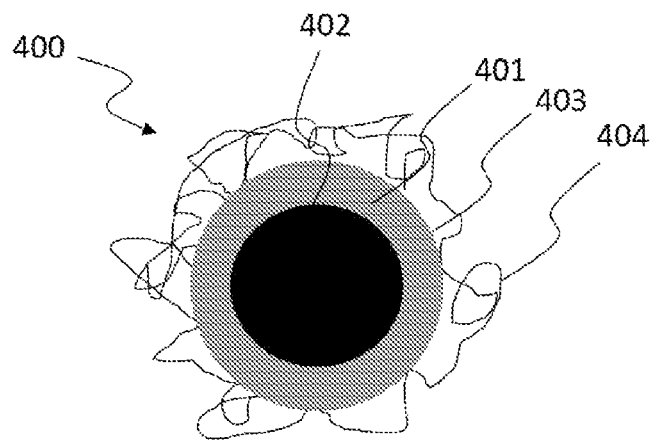
FIG. 4A　　　　　　　　FIG. 4B
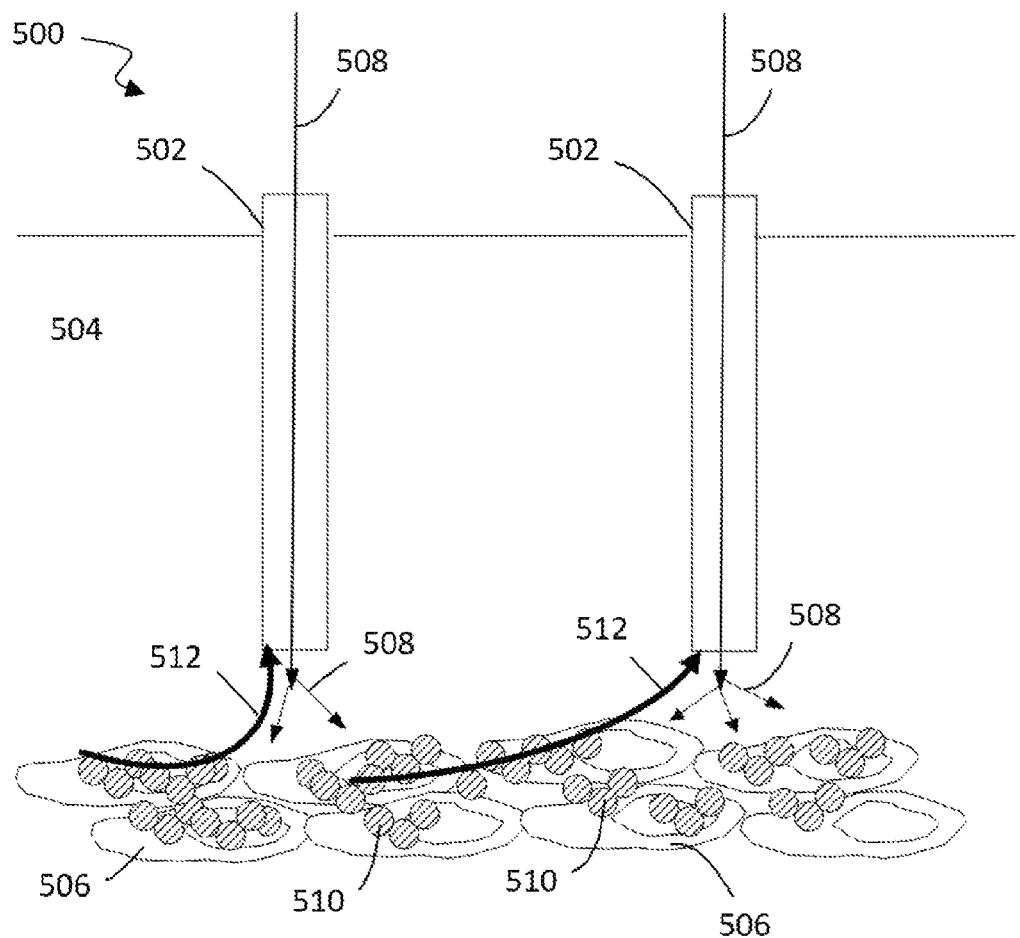
FIG. 5

EXTENDED RELEASE ASPHALTENE INHIBITOR COMPOSITION

CROSS-REFERENCE TO RELATED APPLICATIONS

This application is a national phase application under 35 U.S.C. § 371 of International Application No. PCT/IB2022/052856, filed Mar. 28, 2022, which claims the benefit of U.S. Provisional Application No. 63/167,445, filed Mar. 29, 2021. The contents of the referenced applications are incorporated into the present application by reference.

BACKGROUND OF THE INVENTION

A. Field of the Invention

The invention generally concerns nanoparticles that can be used as well-treatment additives. The nanoparticles can contain a carrier material and an asphaltene inhibitor.

B. Description of Related Art

Asphaltenes are a heavy fraction of crude oil and contains heterocyclic macromolecules having molecular weight of approximately 700 to 1,000 g/mole. Asphaltenes are typically present in hydrocarbon reservoirs. Asphaltenes may become problematic once they are destabilized in solution, leading to asphaltene deposition and precipitation. Asphaltene can become destabilized due to a number of factors such as changes in temperature, pressure, chemical composition of crude oil, and/or shear rate during petroleum production. Asphaltene deposition and precipitation can occur throughout the petroleum production system, from inside the reservoir formation to pumps, tubing, wellheads, safety valves, flow lines, and surface facilities used in the petroleum production process. The nature of asphaltene deposits may depend on the composition of the crude oil and/or the conditions under which precipitation occurred. Asphaltene deposits can appear hard and coal-like or sticky and tar-like. Asphaltene deposition and precipitation can cause plugging problems, such as pore throat plugging, which may cause blockages and lead to lower production rates. Asphaltene deposition may increase hydrocarbon viscosity which may lead to separation problems. Asphaltene deposition and precipitation can cause adverse effects in both production and refining of petroleum.

Asphaltene inhibitors can be used to control formation of asphaltene deposits by controlling the precipitation of asphaltene. Various asphaltene inhibitors are known that can prevent or reduce asphaltene precipitation from crude oil, prevent or reduce deposition of asphaltene on surfaces that come contact with crude oil, and/or help in removal of an asphaltene deposit already formed on a surface. For example, US patent application publications 20170058185 and 20190177630 disclose phenol aldehyde, and aromatic core containing asphaltene inhibitors, respectively.

The typical approach for treating well formations with asphaltene inhibitors includes delivery of the inhibitors through a capillary string in a continuous treatment downhole. This can leave portions of the reservoir untreated and can also consume large amounts of the inhibitor. Pre-existing infrastructure is needed to deploy the treatment and is not easily retrofitted to wells that exhibit a sudden onset of asphaltene formation/deposits.

SUMMARY OF THE INVENTION

A discovery has been made that provides a solution to at least one or more of the problems associated with treating subterranean formations (e.g., reservoirs) and/or wells (e.g., oil, gas and water wells) with asphaltene inhibitors. In one aspect, a solution can reside in the development of a nanoparticle that can include a carrier material and an asphaltene inhibitor(s). The nanoparticle can be structured such that it is capable of releasing the asphaltene inhibitor(s) over prolonged or extended periods of time. In one aspect, the nanoparticle can be structured such that the asphaltene inhibitor can be attached to the carrier material. The nanoparticle can allow for a slow release profile of the asphaltene inhibitor after being introduced into wells or subterranean formations. In some aspects, the release profile can be at least for 10, 20, 30, 40, 50, 60, 70, 80, 90, 100, 200, 300, 400, 500, 1,000, 2,000, 3,000, or 4,000, days or more, or from 10 days to 500 days, or from 20 days to 365 days, or from 500 days to 2500 days, or from 500 days to 2000 days, or from 10 days to 10 years after well treatment. The time the nanoparticle continues to return meaningful concentrations of the asphaltene inhibitor(s) can vary depending on the production rate of the well. This, in turn, can reduce the costs, expenses, and overall inefficiencies with having to perform continuous or more periodic well treatments such as with the processes currently used in the well-treatment industry. In one particular aspect, asphaltene inhibitor containing nanoparticles of the invention can be used to treat subterranean formations and/or wells by squeeze treatment. The subterranean formations and/or wells can be treated with the nanoparticles of the invention with currently available infrastructure. In certain aspects, 2000 Kilogram (kg) to 50000 kg of the nanoparticles can be used to treat, such as via squeeze treatment, subterranean formations and/or wells for 300000 barrels to 8000000 barrels of oil produced.

One aspect of the present invention is directed to a nanoparticle that contains a releasable asphaltene inhibitor. The nanoparticle can further contain a carrier material. The asphaltene inhibitor can be impregnated within the nanoparticle, and/or can be bound or otherwise adhered on at least a portion of an outer surface of the nanoparticle. For example, the nanoparticle can contain a carrier material matrix, and the asphaltene inhibitor in the nanoparticle i) can be impregnated within the matrix, ii) can be surrounded by the matrix and/or iii) can be bound or otherwise adhered to at least a portion of the surface of the matrix. The nanoparticle can have a size of 10 nm to 500 nm. The size can be determined by the diameter of the nanoparticle. In certain aspects, the nanoparticle can have a size of 50 nm to 400 nm. In some aspects, the nanoparticle can contain 5 wt. % to 95 wt. % of the carrier material and 5 wt. % to 95 wt. % of the asphaltene inhibitor. In some particular aspects, the nanoparticle can contain 20 wt. % to 80 wt. % of the carrier material and 20 wt. % to 80 wt. % of the asphaltene inhibitor. In some aspects, the carrier material matrix can be a porous matrix. In some aspects, the carrier material matrix can be an open-celled porous matrix. In some aspects, the carrier material can contain a metalloid matrix (e.g. a silica matrix), a polymer matrix, a carbon matrix, a transition or post-transition metal oxide matrix, lipid matrix, wax matrix, or a column 2 metal oxide matrix, or any combinations thereof. In some aspects, the carrier material can contain silica matrix. In some aspects, the silica matrix can contain porous silica. In some aspects, the silica matrix can contain open-celled porous silica. The open-celled porous silica can be microporous, mesoporous or macroporous silica. In some particular aspects, the open-celled porous matrix (e.g., silica matrix) can contain pores having an average pore size of 0.1 nm to 200 nm. In some aspects, at least a portion of the asphaltene inhibitor in the nanoparticle can be contained in the pores of the porous matrix, such as open-celled porous silica matrix. In certain aspects, the nanoparticle can have a core-shell structure, containing a core containing the asphaltene inhibitor and a shell containing carrier material matrix. In certain aspects, the shell can contain porous silica matrix, such as open-celled porous silica matrix. In certain aspects, 90 wt. % or more of the core, based on the total weight of the core, can be comprised of the asphaltene inhibitor. In certain aspects, the shell can further contain the asphaltene inhibitor, and at least a portion of the asphaltene inhibitor in the shell can be comprised in the pores of the porous matrix of the shell and/or attached to at least a portion of a surface of the shell. In some aspects, the carrier matrix and asphaltene inhibitor containing nanoparticle do not have a core-shell structure. In some aspects, the carrier matrix can form the bulk of the nanoparticle and the asphaltene inhibitor can be bound or otherwise adhered to an outer surface of the carrier matrix, and/or at least a portion of the asphaltene inhibitor in the nanoparticle can be comprised in the pores of the porous carrier material matrix. In some aspects, the carrier matrix and asphaltene inhibitor containing nanoparticle can be free of, or substantially free of a metal. In certain aspects, the carrier material can contain a polymer matrix. In some aspects, the polymer matrix can contain a polymer such as polyolefin, paraffin wax, fatty glyceride, polyacrylamide, polystyrene, epoxide, polyester or any combinations thereof. In some aspects, the polymer can have a melting point of 30° C. to 300° C. In some particular aspects, the polymer can have a melting point of 50° C. to 200° C. In some aspects, the polymer matrix can contain polyolefin. In some aspects, the polyolefin can be polyethylene. In some aspects, the polyethylene can be oxidized polyethylene. In some particular aspects, the polyethylene, such as oxidized polyethylene can have i) a weight average molecular weight (Mw) of 2000 g/mol. to 20000 g/mol, and/or ii) a melting point of 30° C. to 300° C., preferably 50° C. to 200° C. In certain aspects, polyethylene, such as oxidized polyethylene can form the bulk of the particle, and the asphaltene inhibitor can be impregnated within, e.g. distributed through the bulk of the particle, and can be bound or otherwise adhered to an outer surface of the particle. In certain aspects, the carrier material can contain a transition metal oxide matrix. In certain aspects, the transition metal can be titanium. In certain aspects, the carrier material can contain a post-transition metal oxide matrix. In certain aspects, the carrier material can contain a carbon matrix. In some aspects, the carbon matrix can be a porous carbon matrix. In some aspects, the carbon matrix can be an open-celled porous carbon matrix. In some particular aspects, the open-celled porous carbon matrix can contain pores having an average size of 2 nm to 50 nm. In certain aspects, the nanoparticle can contain a lipid matrix. In certain aspects, the nanoparticle can contain a wax matrix. In certain aspects, the nanoparticle can contain a column 2 metal oxide matrix. The asphaltene inhibitor can be a suitable asphaltene inhibitor known in the art. In certain aspects, the commercially available asphaltene inhibitors can be used includes but are not limited to FLOTREAT DF 267 from Clariant, FLOTREAT DF 15980 from Clariant, FATHOM XT SUBSEA525 from Baker Hughes, ASPH16507A from NALCO Champion and ASI 1262 from Total Additives.

In some aspects, the asphaltene inhibitor can be physically entrapped within and/or detachably attached, e.g., chemically bonded, adsorbed, or otherwise adhered to the carrier material. The asphaltene inhibitor can be chemically bonded through an ionic bond, a covalent bond, a hydrogen bond, or a van der Waals interaction to the carrier material. In some aspects, the asphaltene inhibitor can be absorbed onto the carrier material. The asphaltene inhibitor can be capable of being released from the nanoparticle in a controlled manner over an extended period (e.g., at least for 10, 20, 30, 40, 50, 60, 70, 80, 90, 100, 200, 300, 400, 500, 1,000, 2,000, 3,000, or 4,000, days or more, or from 10 days to 500 days, or from 20 days to 365 days, or from 500 days to 2500 days, or from 500 days to 2000 days, or from 10 days to 10 years after well treatment). In certain aspects, 2000 kg to 50000 kg of the nanoparticles can be used to treat, such as via squeeze treatment, subterranean formations and/or wells for 300000 barrels to 8000000 barrels of oil produced. In certain aspects, the nanoparticle can further contain a surface modifying agent. The surface modifying agent can be impregnated within the nanoparticle, and/or can be bound or otherwise adhered on the surface of the nanoparticle. In certain aspects, the surface modifying agent can be bound or otherwise adhered on the surface of the nanoparticle. In certain aspects, the surface modifying agent can be sorbitan monooleate, sodium dodecylbenzene sulfonate, cetylpyridinium chloride, benzyldimethylhexadecyl-ammonium chloride, bis(2-ethylhexyl)phosphate, cetrimonium chloride, cetrimonium bromide, 3-aminopropyltriethoxysilane, n-octadecyltrimethoxysilane or any combinations thereof. In some aspects, the carrier material can contain the polymer matrix, and the nanoparticle can have the surface modifying agent bound or otherwise adhered on the surface of the nanoparticle. In some aspects, the surface modifying agent of the polymer matrix containing nanoparticle can be sorbitan monooleate, sodium dodecylbenzene sulfonate, cetylpyridinium chloride, benzyldimethylhexadecyl-ammonium chloride, bis(2-ethylhexyl)phosphate, or any combinations thereof. In some aspects, the core-shell nanoparticle can contain the surface modifying agent bound or otherwise adhered on the surface of the nanoparticle. In certain aspects, the surface modifying agent of the core-shell nanoparticle can be 3-aminopropyltriethoxysilane and/or n-octadecyltrimethoxysilane. In some particular aspects, the surface modifying agent of the core-shell nanoparticle can be 3-aminopropyltriethoxysilane. In some aspects, the core-shell nanoparticle can further contain a surface active agent in the core. In some particular aspects, the surface active agent can be a cationic surfactant such as cetrimonium chloride, cetrimonium bromide, or any combinations thereof.

Also disclosed are methods for producing the nanoparticles of the present invention. The method can include contacting the asphaltene inhibitor with the carrier material to form the nanoparticle. In certain aspects, the carrier material can contain a polymer matrix, and the method can include contacting the polymer, the asphaltene inhibitor and a continuous phase (e.g. an immiscible solvent), at a temperature above the melting point of the polymer to form an emulsion containing the polymer and the asphaltene inhibitor, and cooling the emulsion to form a nanoparticle containing the polymer and asphaltene inhibitor. In certain aspects, the polymer and the asphaltene inhibitor can be contacted to form a mixture having a temperature greater than the melting point of the polymer, and the mixture can be contacted with the immiscible solvent to form the emulsion. The polymer and the asphaltene inhibitor can form a discontinuous droplet phase, and the immiscible solvent can form a continuous phase of the emulsion. The polymer and/or the asphaltene inhibitor can be heated before, during, and/or after contacting with each other to form the mixture having a temperature greater than the melting point of the polymer. The immiscible solvent can be immiscible with the polymer and the asphaltene inhibitor. In some aspects, the immiscible solvent can be water, acetic acid, butanol, ethylene glycol, acetyl acetone, or any combinations thereof, preferably water. In some aspects, a surface modifying agent can be contacted with the immiscible solvent, before, during, and/or after contacting the mixture with the immiscible solvent. In certain aspects, the mixture (e.g., of the polymer and the asphaltene inhibitor) can further contain the surface modifying agent, and the surface modifying agent can be contacted with the immiscible solvent and/or with the mixture. The surface modifying agent can be a non-ionic surfactant, an anionic surfactant, a cationic surfactant, an amphoteric surfactant, a zwitterionic surfactant, a block co-polymer, an organic compound, or any combinations thereof. In some aspects, the surface modifying agent used for preparing the polymer and the asphaltene inhibitor containing nanoparticle can include sorbitan monooleate, sodium dodecylbenzene sulfonate, cetylpyridinium chloride, benzyldimethylhexadecyl-ammonium chloride, bis(2-ethylhexyl)phosphate, or any combinations thereof. Without wishing to be bound by theory it is believed that surface modifying agent can control emulsion droplet formation, and/or stabilize the synthesized nanoparticles. In certain aspects, the surface modifying agent can get bound or otherwise adhered on the surface of the nanoparticle. In certain aspects, the polymer can be polyolefin, paraffin wax, fatty glyceride, polyacrylamide, polystyrene, epoxide, polyester or any combinations thereof. In some aspects, the polymer can be polyolefin. In some aspects, the polyethylene can be oxidized polyethylene.

In certain aspects, the carrier material can contain a metal oxide or metalloid oxide matrix (e.g., a silica matrix). The method can include contacting the asphaltene inhibitor with a metal oxide or metalloid oxide (e.g. silica) precursor to form a nanoparticle containing metal oxide or metalloid oxide (e.g. silica), and the asphaltene inhibitor. In certain aspects, the silica precursor can be a silicon alkoxide to form a silica matrix. In some particular aspects, the silica alkoxide can be propyl trimethoxysilane. In some aspects, the nanoparticle produced can have a core-shell structure comprising a core comprising the asphaltene inhibitor and a shell comprising the metal oxide or metalloid oxide (e.g. silica) matrix. In some aspects, the asphaltene inhibitor and the metal oxide or metalloid oxide (e.g. silica) precursor can be contacted in a solution. In certain aspects, the asphaltene inhibitor and/or the metal oxide or metalloid oxide (e.g. silica) precursor can be added to the solution at 50° C. to 90° C. In some aspects, the method further includes adding a catalyst to the solution. The catalyst can catalyze formation of the metal oxide or metalloid oxide (e.g. silica) from the metal oxide or metalloid oxide (e.g. silica) precursor. In some aspects, the catalyst can be triethanolamine, and/or ammonium hydroxide, preferably triethanolamine. In certain aspects, the solution can have a pH of 6 to 11, preferably 7.5 to 11, after addition of the catalyst. In some aspects, the method can include adding a surface active agent to the solution. In some aspects, the surface active agent used for preparing the metal oxide or metalloid oxide (e.g. silica), and the asphaltene inhibitor containing core-shell nanoparticle can be a cationic surfactant. In some aspects, the cationic surfactant can be a cetyltrimethylammonium halide, such as cetyltrimethylammonium chloride and/or cetyltrimethylammonium bromide, preferably cetyltrimethylammonium bromide. In some aspects, the surface active agent can be positioned in the core of the core-shell nanoparticle produced. In certain aspects, the method can include addition of a surface modifying agent to the solution, where the surface modifying agent can get bound and/or adhered to the outer surface of the shell and the nanoparticle. In some particular aspects, the surface modifying agent added to the solution can be (3-aminopropyl)triethoxysilane (APTES) and/or n-octadecyltrimethoxysilane, preferably (3-aminopropyl)triethoxy silane.

One aspect is directed to a well treatment composition containing a plurality of the nanoparticles of the present invention. The plurality of the nanoparticles can have an average size of 10 nm to 500 nm, preferably 50 nm to 400 nm. In some aspects, the well treatment composition can be a fluid. In some aspects, the well treatment composition can be a dispersion. In some aspects, the well treatment composition can further contain a solvent. The solvent can be water, salt water, an organic solvent, an acidic aqueous solution, low sulfate seawater, an aqueous sodium carbonate solution, a surfactant, or other flush fluid, or any combinations thereof. In some aspects, the plurality of the nanoparticles can be dispersed in the solvent. In certain aspects, the solvent can contain water. In certain aspects, the solvent can contain organic solvent. In some aspects, the organic solvent can contain aromatic hydrocarbons, such as $C_6$-$C_{15}$ aromatic hydrocarbons. In certain aspects, the organic solvent can contain toluene, xylene, $C_9$ aromatic hydrocarbons, $C_{10}$ aromatic hydrocarbons, or any combinations thereof. Commercially available organic solvent that can be used includes but is not limited to SHELLSOL A150 (C9-C10 aromatic hydrocarbon solvent) sold by Shell chemicals. The well treatment composition can be a controlled-release composition capable of releasing the asphaltene inhibitor over an extended period of time, such as at least for 10, 20, 30, 40, 50, 60, 70, 80, 90, 100, 200, 300, 400, 500, 1,000, 2,000, 3,000, or 4,000, days or more, or from 10 days to 500 days, or from 20 days to 365 days, or from 500 days to 2500 days, or from 500 days to 2000 days, or from 10 days to 10 years after well treatment. In certain aspects, well treatment composition containing 2000 kg to 50000 kg of the nanoparticles can be used to treat, such as via squeeze treatment, subterranean formations and/or wells for 300000 barrels to 8000000 barrels of oil produced.

Another aspect is directed to a method of treating a subterranean formation (e.g., a reservoir or an uncased well) or a wellbore. The method includes injecting the well treatment composition described herein, into a wellbore. The wellbore can intersect the subterranean formation. The subterranean formation can be a hydrocarbon formation. In some aspects, the treating can be squeeze treating the subterranean well formation or wellbore. In some aspects, the treating can be continuous treating or spear treating the subterranean well formation or wellbore.

In some aspects, an asphaltene inhibitor squeeze treatment can be performed by pushing a composition comprising the nanoparticle of the present invention into a producing formation and fixing the nanoparticle within the formation. In one aspect, a squeeze treatment can include any one of, any combination of, or all of (1) a pre-flush stage, which can include the injection of a volume of fluid that may contain chemicals, e.g., acids, chelating agents, surfactants, biocides, etc., to clean the production tubing and wellbore (preflush), (2) administration of the composition comprising the nanoparticle within the formation, and/or (3) administration of an overflush solution to further push the composition comprising the nanoparticle of the present invention into the formation. In certain aspects, the pre-flush fluid can contain a mutual solvent, a surfactant, an organic solvent, an asphaltene inhibitor (neat, e.g. without being attached to the carrier material), or any combinations thereof. In some aspects, the well can be shut in for a period of time after administration of the overflush solution. In certain aspects, the well can be shut in for 12 h to 36 h after administration of the overflush solution. In some aspects, spacer stages can be introduced between the stages, e.g between the (1) pre-flush and (2) flush, and/or (2) flush and (3) over flush stages.

Also disclosed in the context of the present invention are aspects 1-50. Aspect 1 is a nanoparticle comprising a carrier material and an asphaltene inhibitor, wherein the asphaltene inhibitor is releasable from the carrier material, and wherein the nanoparticle has a size of 10 nanometers (nm) to 500 nm. Aspect 2 is the nanoparticle of aspect 1, having a size of 50 nm to 400 nm. Aspect 3 is the nanoparticle of any one of aspects 1 to 2, wherein the nanoparticle comprises 5 wt. % to 95 wt. %, preferably 20 wt. % to 80 wt. %, of the carrier material and 5 wt. % to 95 wt. %, preferably 20 wt. % to 80 wt. %, of the asphaltene inhibitor. Aspect 4 is the nanoparticle of any one of aspects 1 to 3, wherein the asphaltene inhibitor is physically entrapped within the carrier material and/or bound to the carrier material through an ionic bond, a covalent bond, a hydrogen bond, a van der Waals interaction or by adsorption onto a surface of the carrier material. Aspect 5 is the nanoparticle of aspect 4, wherein the asphaltene inhibitor is adsorbed onto the surface of the carrier material. Aspect 6 is the nanoparticle of any one of aspects 1 to 5, wherein at least a portion of the surface of the nanoparticle comprises a surface modifying agent. Aspect 7 is the nanoparticle of any one of aspects 1 to 6, wherein the carrier material comprises a silica matrix, a polymer matrix, a carbon matrix, a transition or post-transition metal oxide matrix, lipid matrix, wax matrix, a column 2 metal oxide matrix, or any combinations thereof. Aspect 8 is the nanoparticle of aspect 7, wherein the matrix is an open-celled porous matrix. Aspect 9 is the nanoparticle of any one of aspects 1 to 8, wherein the carrier material is a silica matrix. Aspect 10 is the nanoparticle of aspect 9, wherein the silica matrix is an open-celled porous silica matrix, preferably having an average pore size of 2 nm to 50 nm. Aspect 11 is the nanoparticle of aspect 10, wherein at least a portion of the asphaltene inhibitor is comprised in the pores of the porous silica matrix. Aspect 12 is the nanoparticle of any one of aspects 1 to 11, wherein the nanoparticle has a core-shell structure comprising a core comprising the asphaltene inhibitor and a porous shell comprising the carrier material. Aspect 13 is the nanoparticle of aspect 12, wherein the nanoparticle has a diameter of 250 nm to 350 nm, the thickness of the shell is 50 nm to 150 nm, and/or wherein at least 90 wt. % of the core, based on the total weight of the core, comprises the asphaltene inhibitor. Aspect 14 is the nanoparticle of any one of aspects 12 to 13, wherein the shell comprises the asphaltene inhibitor on at least a portion of the shell surface and/or in the pores of the shell. Aspect 15 is the nanoparticle of any one of aspects 6 to 14, wherein the carrier material is a silica matrix, and the surface modifying agent is 3-Aminopropyltriethoxysilane and/or n-Octadecyltrimethoxysilane, preferably 3-Aminopropyltriethoxysilane, and the nanoparticle further comprises a cationic surfactant, preferably cetyltrimethylammonium Bromide (CTAB). Aspect 16 is the nanoparticle of any one of aspects 1 to 8 and 12 to 14, wherein the carrier material is a polymer matrix. Aspect 17 is the nanoparticle of aspect 16, wherein the polymer matrix comprises a polyolefin. Aspect 18 is the nanoparticle of aspect 17, wherein the polyolefin is a polyethylene, preferably an oxidized polyethylene. Aspect 19 is the nanoparticle of any one of aspects 16 to 18, wherein the polymer matrix has a melting point of 30° C. to 300° C., preferably 50° C. to 200° C. Aspect 20 is the nanoparticle of any one of aspects 1 to 19, wherein the asphaltene inhibitor is capable of being released from the nanoparticle over an extended period of time. Aspect 21 is the nanoparticle of any one of aspects 1 to 20, wherein 2000 kg to 50000 kg of the nanoparticles is capable of treating subterranean formations and/or wells for 300000 barrels to 8000000 barrels of oil produced.

Aspect 22 is a well treatment composition comprising a plurality of the nanoparticles of any one of aspects 1 to 21. Aspect 23 is the well treatment composition of aspect 22, wherein the plurality of the nanoparticles has an average particle size of 10 nm to 500 nm, preferably 50 nm to 400 nm. Aspect 24 is the well treatment composition of any one of aspects 22 to 23, wherein the composition is a fluid. Aspect 24 is the well treatment composition of any one of aspects 22 to 24, wherein the well-treatment composition comprises 2000 kg to 50000 kg of the nanoparticles, and is capable of treating subterranean formations and/or wells for 300000 barrels to 8000000 barrels of oil produced. Aspect 26 is the well treatment composition of any one of aspects 22 to 25, further comprising water, a surfactant, or an organic solvent, or any combinations thereof. Aspect 27 is the well treatment composition of aspect 26, wherein the water comprises salt water, an acidic aqueous solution, a low sulfate seawater, or an aqueous sodium carbonate solution, or any combinations thereof.

Aspect 28 is a method of treating a subterranean formation or a wellbore, the method comprising injecting the composition of any one of aspects 22 to 27 into the wellbore, the wellbore intersecting the subterranean formation. Aspect 29 is the method of aspect 28, wherein treating is squeeze treating the subterranean formation or wellbore. Aspect 30 is the method of aspect 29, wherein squeeze treating comprises: (a) injecting a pre-flushing composition into the wellbore to displace fluids in the wellbore and/or to condition the subterranean formation; (b) subsequently injecting the composition of any one of aspects 22 to 27 into the wellbore under conditions sufficient such that the composition of any one of aspects 22 to 27 contacts the subterranean formation; and (c) subsequently injecting an over-flush composition into the wellbore to increase retention of the composition of any one of aspects 22 to 27 in the subterranean formation. Aspect 31 is the method of aspect 28, wherein treating is continuous treating or spear treating the subterranean formation or wellbore.

Aspect 32 is a method for making the nanoparticle of any one of aspects 1 to 21, the method comprising contacting the asphaltene inhibitor with the carrier material to form the nanoparticle. Aspect 33 is the method of aspect 32, wherein the carrier material comprises a polyethylene matrix and the method comprises: contacting polyethylene with the asphaltene inhibitor at a temperature above melting point of the polyethylene to form an emulsion comprising the polyethylene and the asphaltene inhibitor; and cooling the emulsion to form a nanoparticle comprising the polyethylene and asphaltene inhibitor. Aspect 34 is the method of aspect 33, wherein the polyethylene and the asphaltene inhibitor can be contacted to form a mixture having a temperature greater than the melting point of the polyethylene, and the mixture can be contacted with an immiscible solvent to form the emulsion, wherein a continuous phase of the emulsion comprises the immiscible solvent, and a discontinuous droplet phase of the emulsion comprises the polyethylene and asphaltene inhibitor. Aspect 35 is the method of aspect 34, wherein the immiscible solvent is water, acetic acid, butanol, ethylene glycol, acetyl acetone, or any combinations thereof, preferably water. Aspect 36 is the method of aspect 34 or 35, wherein a surface modifying agent is contacted with the immiscible solvent, before, during and/or after contacting the mixture with the immiscible solvent. Aspect 37 is the method of aspect 36, wherein the surface modifying agent is a non-ionic surfactant, an anionic surfactant, a cationic surfactant, an amphoteric surfactant, a zwitterionic surfactant, a block co-polymer, an organic compound, or any combinations thereof. Aspect 38 is the method of any one of aspects 36 to 37, wherein the surface modifying agent is sorbitan monooleate, sodium dodecylbenzene sulfonate, cetylpyridinium chloride, benzyldimethylhexadecyl-ammonium chloride, bis(2-ethylhexyl)phosphate, or any combinations thereof. Aspect 39 is the method of aspect 32, wherein the carrier material comprises a silica matrix and the method comprises contacting the asphaltene inhibitor with a silica precursor to form a nanoparticle comprising silica and the asphaltene inhibitor. Aspect 40 is the method of aspect 39, wherein the silica precursor is a silicon alkoxide. Aspect 41 is the method of any one of aspects 39 to 40, wherein at least a portion of the asphaltene inhibitor in the nanoparticle is comprised within open celled pores of the silica matrix. Aspect 42 is the method of any one of aspects 39 to 41, wherein the nanoparticle has a core-shell structure comprising a core comprising the asphaltene inhibitor and a shell comprising the silica matrix. Aspect 43 is the method of any one of aspects 39 to 42, wherein the asphaltene inhibitor and the silica precursor is contacted in a solution. Aspect 44 is the method of aspect 43, further comprising adding a catalyst to the solution, wherein the catalyst catalyzes formation of the silica from the silica precursor. Aspect 45 is the method of aspect 44, wherein the catalyst is triethanolamine, and/or ammonium hydroxide, preferably triethanolamine. Aspect 46 is the method of any one of aspects 43 to 45, further comprising adding a surface active agent to the solution. Aspect 47 is the method of aspect 46, wherein the surface active agent is a cationic surfactant. Aspect 48 is the method of aspect 47, wherein the cationic surfactant is a cetyltrimethylammonium halide, such as cetyltrimethylammonium chloride and/or cetyltrimethylammonium bromide, preferably cetyltrimethylammonium bromide. Aspect 49 is the method of any one of aspects 39 to 48, further comprising adding a surface modifying agent comprising an alkyl siloxane with long alkyl chain, to the solution. Aspect 50 is the method of aspect 49, wherein the surface modifying agent comprises (3-Aminopropyl) triethoxy silane (APTES).

The term "capable of being released" as it relates to the subterranean well treatment composition means that, under conditions of use, e.g., in a subterranean well, the asphaltene inhibitor can dissociate, desorb, hydrolyze, becomes chemically unbound, or becomes otherwise separated from the carrier material matrix of the nanoparticle and available for use for its intended purpose, e.g., prevention in formation, reduction in formation, and/or removal of asphaltene deposition in a subterranean well.

The term "asphaltene inhibitor" can include a chemical(s) compound, combination of chemical compounds, and/or a composition comprising a chemical compound(s) that prevents or reduces asphaltene precipitation from crude oil, prevents or reduces deposition of asphaltene on surfaces in contact with crude oil, and/or helps in removal of an asphaltene deposit already formed on a surface, or any combinations thereof.

The term "controlled release over an extended period of time" relates to the release rate of the asphaltene inhibitor from the nanoparticle. It can indicate that the asphaltene inhibitor is in an environment of use such as, e.g., a subterranean well, released from the nanoparticle over a longer period of time than if asphaltene inhibitor were not bound, adsorbed or otherwise adhered to the carrier material of the nanoparticle of the present invention.

The terms "formation fluid" or "formation fluids" includes liquids and gases present in a formation. Non-limiting examples, of formation fluid include hydrocarbon liquids and gases, water, salt water, sulfur and/or nitrogen containing hydrocarbons, inorganic liquids and gases and the like.

The terms "about" or "approximately" are defined as being close to as understood by one of ordinary skill in the art. In non-limiting embodiment, the terms are defined to be within 10%, preferably within 5%, more preferably within 1%, and most preferably within 0.5%.

The terms "wt. %," "vol. %," or "mol. %" refers to a weight, volume, or molar percentage of a component, respectively, based on the total weight, the total volume of material, or total moles, that includes the component. In a non-limiting example, 10 grams of component in 100 grams of the material is 10 wt. % of component.

The term "substantially" and its variations are defined to include ranges within 10%, within 5%, within 1%, or within 0.5%.

The terms "inhibiting close" or "reducing" or "preventing" or "avoiding" or any variation of these terms, when used in the claims and/or the specification includes any measurable decrease or complete inhibition to achieve a desired result. The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The nanoparticles and methods of the present invention can "comprise," "consists essentially of," or "consists of" particular elements, ingredients, components, compositions, etc. disclose throughout the specification. With respect to the transitional phrase "consisting essentially of," in one non-limiting aspect a basic and novel characteristic of the nanoparticle(s) of the present invention is/are their ability to deliver a controllable release asphaltene inhibitor over an extended period of time during use (e.g., in subterranean wells) and/or the nanoparticles can be delivered through a squeeze treatment process.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, on recited elements or method steps.

Other objects, features and advantages of the present invention will become apparent from the following figures, a detailed description, and examples. It should be understood, however, that the figures, detailed description, and examples, while indicating specific embodiments of the invention, are given by way of illustration only, and are not meant to be a limiting. Additionally, it is contemplated that changes and modifications within the spirit and scope of the invention will become apparent to those skilled in the art from this detailed description.

BRIEF DESCRIPTION OF THE DRAWINGS

FIGS. 4A and 4B are schematics of cross sections of nanoparticle according to yet another aspect of the present invention.

FIG. 5 is a schematic of a method to treat a subterranean well using the nanoparticles of the present invention loaded with an asphaltene inhibitor.

FIG. 8A shows mesoporous silica shell and asphaltene inhibitor core morphology, and FIG. 8B shows porous nature of the particles.

DETAILED DESCRIPTION OF THE INVENTION

Figure 1A:
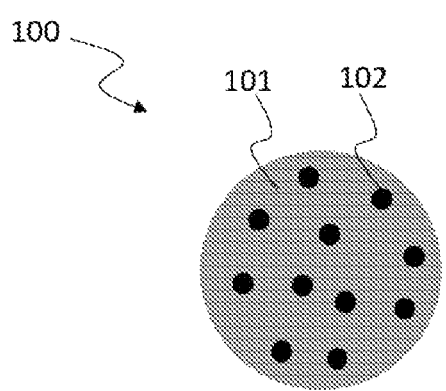
FIGS. 1A and 1B are schematics of cross sections of nanoparticles according to certain aspects of the present invention.

A discovery has been made, which provides nanoparticulate carriers for asphaltene inhibitors. These nanoparticulate carriers can provide extended or sustained release of an asphaltene inhibitor in an environment of use, e.g., in a subterranean oil, gas well, water well, or any subterranean reservoir. Controlled release of such additives over an extended period of time decreases or eliminates the need to retreat wells or subterranean formations (e.g., hydrocarbon reservoirs) with the asphaltene inhibitors, providing a cost and labor savings, and less environmental risks. The discovery is premised on physically entrapping the asphaltene inhibitor within a carrier material matrix and/or bonding or adsorbing the asphaltene inhibitor to the carrier material matrix of the nanoparticles. The carrier material matrix can be silica matrix, a polymer matrix, a carbon matrix, a transition or post-transition metal oxide matrix, lipid matrix, wax matrix, a column 2 metal oxide matrix, or any combinations thereof.

The invention provides an elegant way to provide a cost- and labor-effective methods to deliver asphaltene inhibitor containing nanoparticles to wells so that they release the asphaltene inhibitors over a long period of time, in a manner that reduces or eliminates the need to retreat wells with the inhibitor. The invention also provides effective methods to deliver asphaltene inhibitor to fluids used to produce fluids (e.g., oil and gas) from subterranean formations. For example, delivery of asphaltene inhibitor to drilling fluid additives (mud additives), enhanced oil recovery (EOR) fluids, or the like.

The structure of the nanoparticles of the present invention also allows for their use in squeeze treatment processes rather than the typical approach of continuous treatment processes. An advantage of squeeze treatment processes when compared with continuous treatment processes for asphaltene inhibitors is that the squeeze treatment processes can more fully protect the subterranean formations (e.g., reservoirs) and/or wells (e.g., oil, gas and water wells). In some aspects, this more robust protection can be attributed to (1) the sustained release of the asphaltene inhibitor(s) from the carrier matrix materials of the nanoparticles of the present invention, (2) the size of the nanoparticles, which allows them to be placed into and retained in the subterranean formations and/or wells, and/or (3) the carrier matrix materials remaining stable or intact for prolonged periods of time (10, 20, 30, 40, 50, 100, 200, 300, 400, 500, 1,000, 2000, 3,000, or 4,000 days or longer) when introduced into the subterranean formations and/or wells. Another advantage is that the costs and infrastructure associated with continuous injection into the subterranean formations and/or wells can be avoided. The structure of the nanoparticles of the present invention advantageously opens up the possibility of commercial use of squeeze treatment of subterranean formations and/or wells with asphaltene inhibitors.

These and other non-limiting aspects of the present invention are discussed in further detail in the following sections.

A. Asphaltene Inhibitor Containing Nanoparticles

The asphaltene inhibitor containing nanoparticle of the present invention can contain a carrier material and the asphaltene inhibitor attached to the carrier material such that small, but effective, amounts of asphaltene inhibitor can be removed from the nanoparticle over a period of time. The nanoparticle can contain 5 wt. % to 95 wt. %, or equal to any one of, at least any one of, or between any two of 5, 10, 15, 20, 25, 30, 35, 40, 45, 50, 55, 60, 65, 70, 75, 80, 85, 90 and 95 wt. % of the carrier material and 5 wt. % to 95 wt. %, or equal to any one of, at least any one of, or between any two of 5, 10, 15, 20, 25, 30, 35, 40, 45, 50, 55, 60, 65, 70, 75, 80, 85, 90 and 95 wt. % of the asphaltene inhibitor. The weight ratio of the carrier material and the asphaltene inhibitor in the nanoparticle can be 5:95 to 95:5, or equal to any one of, at least any one of, or between any two of 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, and 95:5.

The asphaltene inhibitor can be capable of being released from the nanoparticle in a controlled manner over an extended period of time, e.g., for at least 10, 20, 30, 40, 50, 60, 70, 80, 90, 100, 200, 300, 400, 500, 1,000, 2,000, 3,000, or 4,000, days or more, or from 10 days to 500 days, or from 20 days to 365 days, or from 500 days to 2500 days, or from 500 days to 2000 days, or from 10 days to 10 years after well treatment. In certain aspects, 2000 kg to 50000 kg of the nanoparticles can be used to treat, such as via squeeze treatment, subterranean formations and/or wells for 300000 barrels to 8000000 barrels, or equal to any one of, at least any one of, or between any two of 300000, 500000, 1000000, 2000000, 3000000, 4000000, 5000000, 6000000, 7000000, and 8000000 barrels of oil produced.

Figure 1B:
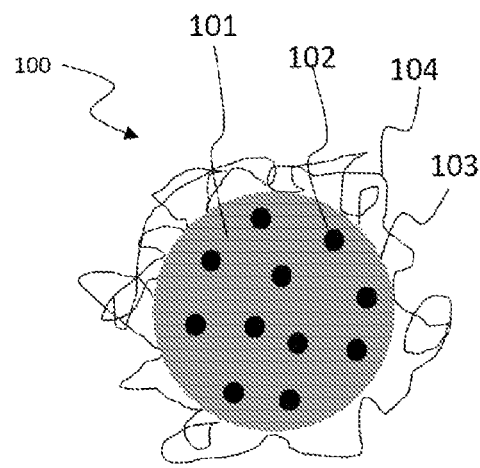

Referring to FIG. 1A, this is a cross-sectional view of a nanoparticle 100 according to one example of the present invention. The carrier material 101 can form the bulk of the particle. The asphaltene inhibitor 102 can be impregnated within, e.g. distributed through (e.g., evenly distributed throughout) the bulk of the particle. The nanoparticle 100 can have a continuous phase (carrier material 101) and a dispersed phase (asphaltene inhibitor 102). Referring to FIG. 1B, in certain aspects, the nanoparticle 100 can contain a surface modifying agent 104 bound or otherwise adhered to an outer surface 103 of the nanoparticle.

Figure 2A:
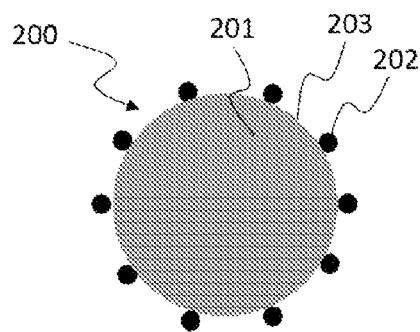
FIGS. 2A and 2B are schematics of cross sections of nanoparticles according to other aspects of the present invention.
Figure 2B:
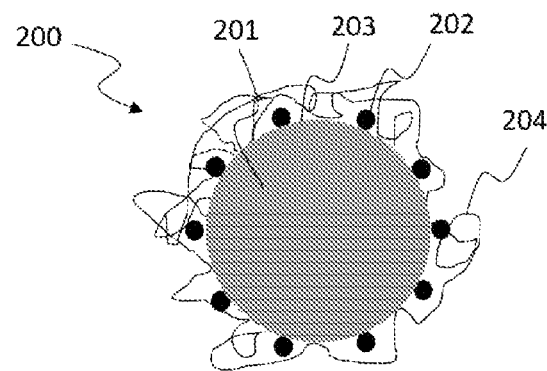

Referring to FIG. 2A a cross-sectional view of a nanoparticle 200 according to another example of the present invention is described. The carrier material 201 can form the bulk of the particle. The asphaltene inhibitor 202 can be bound or otherwise adhered to an outer surface 203 of the nanoparticle. Referring to FIG. 2B, in certain aspects, the nanoparticle 200 can contain a surface modifying agent 204 bound or otherwise adhered to the outer surface 203 of the nanoparticle.

Figure 3A:
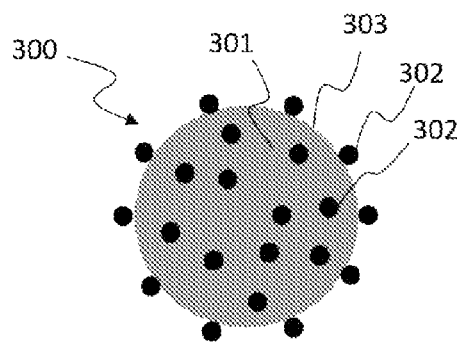
FIGS. 3A and 3B are schematics of cross sections of nanoparticles according to further aspects of the present invention.
Figure 3B:
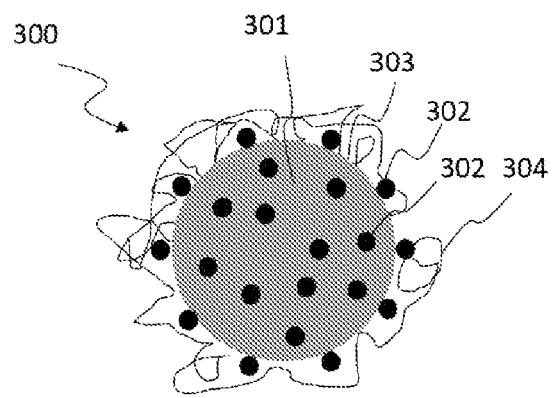

Referring to FIG. 3A a cross-sectional view of a nanoparticle 300 according to another example of the present invention is described. The carrier material 301 can form the bulk of the particle. The asphaltene inhibitor 302 can be impregnated within, e.g. distributed through the bulk of the particle, and can be bound or otherwise adhered to an outer surface 303 of the particle. Referring to FIG. 3B, in certain aspects, the nanoparticle 300 can contain a surface modifying agent 304 bound or otherwise adhered to an outer surface 303 of the nanoparticle.

Referring to FIG. 4, a cross-sectional view of a nanoparticle 400 according to another example of the present invention is described. The nanoparticle 400 can have a core-shell structure and can contain a core 402 containing the asphaltene inhibitor and a shell 401 containing the carrier material. In certain aspects (not shown), the shell 401 can further contain the asphaltene inhibitor. In the embodiment shown in FIG. 4, the core occupies the entirety of the volume of the space or cavity created by the shell 401. In other aspects (not shown), the core may occupy less than the entirety of the volume of the space or cavity created by the shell 401. In certain aspects, core may occupy less than 100%, less than 90%, less than 80%, less than 70%, less than 60%, less than 50%, less than 40%, less than 30%, less than 20%, less than 10%, or 10% to 90%, of the volume of the space or cavity created by the shell 401. In yet another embodiment, a plurality of cores may be present within the volume of the space or cavity created by the shell 401. Referring to FIG. 4B, in certain aspects, the nanoparticle 400 can contain a surface modifying agent 404 bound or otherwise adhered to an outer surface 403 of the shell and the nanoparticle.

The nanoparticle 100, 200, 300, 400 can have a size (e.g., average diameter) of 10 nm to 500 nm, or equal to any one of, at least any one of, or between any two of 10, 50, 100, 150, 200, 250, 300, 350, 400, 450 and 500 nm. In certain aspects, core 402 of the core-shell nanoparticle 400 can have a size (e.g., average diameter) of 250 nm to 350 nm or equal to any one of, at least any one of, or between any two of 250, 260, 270, 280, 290, 300, 310, 320, 330, 340 and 350 nm. In certain aspects, the shell 401 of the core-shell nanoparticle 400 can have a thickness of 50 nm to 150 nm or equal to any one of, at least any one of, or between any two of 50, 60, 70, 80, 90, 100, 110, 120, 130, 140 and 150 nm, over the core 402. In some aspects, at least 90 wt. %, such as 90 wt. % to 100 wt. %, or equal to any one of, at least any one of, or between any two of 90, 91, 92, 93, 94, 95, 96, 97, 98, 99, 99.5, 99.8 and 100 wt. % of the core 402, based on the total weight of the core 402, can be comprised of the asphaltene inhibitor. In certain aspects, the weight ratio of the core 402 and the shell 401 in the core-shell nanoparticle 400 can be 1:1 to 50:1, or equal to any one of, at least any one of, or between any two of 1:1, 2:1, 3:1, 4:1, 5:1, 6:1, 7:1, 8:1, 9:1, 10:1, 15:1, 20:1, 25:1, 30:1, 35:1, 40:1, 45:1 and 50:1. Scanning electron microscopy (SEM) and transmission electron microscopy (TEM) can be used to characterize particle size. In some aspects, in aqueous solutions, nanoparticle size can be measured using laser particle size analysis. In some aspects, in organic solutions, nanoparticle size can be measured with imaging of the bulk and/or imaging of dried particles. In some aspects, SEM and TEM imaging can entail drying and gold sputter coating.

In certain aspects, the shape of the nanoparticles of the present invention can be substantially or completely spherical. Other shapes are also contemplated such as cubic, pyramidal, oval, random, etc.

1. Carrier Material

The carrier material of the nanoparticle, such as of the nanoparticle 100, 200, 300, 400 can contain a carrier material matrix. In certain aspects, the carrier material matrix can be silica matrix, a polymer matrix, a carbon matrix, a transition or post-transition metal oxide matrix, lipid matrix, wax matrix, or a column 2 metal oxide matrix, or any combinations thereof. In some aspects, the carrier material can contain a silica matrix. In some aspects, the carrier material of the nanoparticles, such as of the nanoparticles 100, 200, 300, 400 can contain silica matrix. In some aspects, the silica matrix can be a porous silica matrix. In some aspects, the silica matrix can be an open-celled porous silica matrix. The open-celled porous silica can be microporous, mesoporous or macroporous silica. In some aspects, the open-celled porous silica can be mesoporous silica. In some particular aspects, the open-celled porous silica matrix can contains pores having an average size of 0.1 nm to 200 nm, or 2 nm to 50 nm, or equal to any one of, at least any one of, or between any two of 0.1, 0.5, 1, 2, 5, 10, 15, 20, 25, 30, 35, 40, 45, 50, 100, 150 and 200 nm. In some aspects, the nanoparticle can contain open-celled porous silica matrix and at least a portion of the asphaltene inhibitor in the nanoparticle can be contained in the pores of the open-celled porous silica matrix. For example, in certain aspects, the carrier material 101, 201, 301 of the nanoparticle 100, 200, 300, can contain open celled porous silica matrix, and at least a portion of the asphaltene inhibitors 102, 202, 302 in the nanoparticle 100, 200, 300 can be positioned inside the open celled pores of the silica matrix 101, 201, 301. In certain aspects, the carrier material in the shell 401 of the core-shell nanoparticle 400, can contain open celled porous silica matrix. In some aspects, the shell 401 can further contain an asphaltene inhibitor and at least a portion of the asphaltene inhibitor in the shell can be contained in the open celled pores of the silica in the shell. In certain aspects, the silica containing nanoparticle, can be free of, or essentially free of, or contains less than 1 wt. %, such as less than 0.5 wt. %, such as less than 0.1 wt. %, such as less than 0.05 wt. %, such as less than 0.01 wt. %, of a metal such as column 2 metal, column 14 metal and/or a transition metal, such as beryllium (Be) magnesium (Mg), calcium (Ca), strontium (Sr), barium (Ba), radium (Ra), tin (Sn), lead (Pb), and/or Germanium (Ge).

In some aspects, the carrier material of the nanoparticles, such as of the nanoparticles 100, 200, 300, 400 can contain a polymer matrix. In some aspects, the polymer matrix can contain a polymer such as polyolefin, paraffin wax, fatty glyceride, polyacrylamide, polystyrene, epoxide, polyester, or any combinations thereof. In certain aspects, the polymer matrix can contain polyolefin. In some aspects, the polyolefin can be polyethylene. In certain aspects, the polyethylene can be oxidized polyethylene. The oxidized polyethylene can be polymers that are obtained by treatment of linear or branched polyethylenes with oxygen and/or oxygen containing gases. In certain aspects, melts of linear or branched polyethylenes can be treated with the oxygen and/or oxygen containing gases to obtain the oxidized polyethylene. The oxidized polyethylene can contain oxygen containing functional groups such as carboxyl, carbonyl, and/or hydroxyl groups in the polymer molecule. In some particular aspects, the polymer, such as the polyethylene, such as oxidized polyethylene can have a weight average molecular weight (Mw) of 2000 g/mol. to 20000 g/mol, or equal to any one of, at least any one of, or between any two of 2000, 3000, 4000, 5000, 6000, 7000, 8000, 9000, 10000, 11000, 12000, 13000, 14000, 15000, 16000, 17000, 18000, 19000, and 20000 g/mol, as measured by gel permeation chromatography (GPC). In some particular aspects, the polymer, such as the polyethylene, such as oxidized polyethylene can have melting point of a 30° C. to 300° C., or equal to any one of, at least any one of, or between any two of 30, 50, 75, 100, 125, 150, 175, 200, 225, 250, 275 and 300° C. Commercially available oxidized polyethylene that can be used includes but are not limited to Epolene E-14 and Epolene E-20 sold by Westlake Chemical. In certain aspects, i) polyethylene, such as oxidized polyethylene can form the bulk of the particle, and ii) the asphaltene inhibitor can be impregnated within, e.g. distributed through the bulk of the particle, and can be bound or otherwise adhered to an outer surface of the particle. In certain aspects, polyethylene, such as oxidized polyethylene containing nanoparticles can have a shape of the nanoparticle 300.

In some aspects, the carrier material of the nanoparticles, such as of the nanoparticles 100, 200, 300, 400 can contain a transition metal oxide matrix. Non-limiting examples of transition metals can include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (db), seaborgium (Sg), bohrium (Bh), hassium (Hs), meitnerium (Mt), darmstadtium (Ds), roentgenium (Rg) and/or copernicum (Cn). In certain aspects, the transition metal can be titanium. In certain aspects, the carrier material can contain porous titanium oxide matrix, such as open-celled porous titanium oxide matrix. The porous titanium oxide matrix, such as open-celled porous titanium oxide matrix can contain pores having an average size of 2 nm to 50 nm or equal to any one of, at least any one of, or between any two of 2, 5, 10, 15, 20, 25, 30, 35, 40, 45 and 50 nm. In certain aspects, the transition metal oxide containing nanoparticles can be free of, or essentially free of, or contains less than 1 wt. %, such as less than 0.5 wt. %, such as less than 0.1 wt. %, such as less than 0.05 wt. %, such as less than 0.01 wt. %, of silica.

In some aspects, the carrier material of the nanoparticles, such as of the nanoparticles 100, 200, 300, 400 can contain carbon matrix. In some aspects, the carbon matrix can be a porous carbon matrix. In some aspects, the carbon matrix can be an open-celled porous carbon matrix. In some particular aspects, the open-celled porous carbon matrix can contain pores having an average size of 2 nm to 50 nm or equal to any one of, at least any one of, or between any two of 2, 5, 10, 15, 20, 25, 30, 35, 40, 45 and 50 nm.

In certain aspects, the carrier material of the nanoparticles, such as of the nanoparticles 100, 200, 300, 400, can contain a lipid matrix. In certain aspects, the carrier material of the nanoparticles, such as of the nanoparticles 100, 200, 300, 400, can contain a wax matrix. In certain aspects, the career material of the nanoparticles, such as of the nanoparticles 100, 200, 300, 400, can contain a column 2 metal oxide matrix. Non-limiting examples of column 2 metals include beryllium (Be) magnesium (Mg), calcium (Ca), strontium (Sr), barium (Ba), or radium (Ra). In certain aspects, the column 2 metal oxide containing nanoparticles can be free of, or essentially free of, or contains less than 1 wt. %, such as less than 0.5 wt. %, such as less than 0.1 wt. %, such as less than 0.05 wt. %, such as less than 0.01 wt. %, of silica.

2. Asphaltene Inhibitors

The asphaltene inhibitors can be physically entrapped within and/or detachably attached, e.g. chemically bonded, adsorbed, or otherwise adhered to the carrier material. In certain aspects, the asphaltene inhibitors can be physically entrapped within the carrier material. In certain aspects, the asphaltene inhibitors can be detachably attached, e.g. chemically bonded, adsorbed, or otherwise adhered to the carrier material. The asphaltene inhibitor can be chemically bonded through an ionic bond, a covalent bond, a hydrogen bond, or a van der Waals interaction with the carrier material. Adhesion to the nanoparticle can be through absorption or adsorption onto the particle. The asphaltene inhibitor can be separated from the nanoparticle and the carrier material in response to a stimulus (e.g., formation fluid, water, dilution, and/or pressure).

The asphaltene inhibitor used can be an asphaltene inhibitor known in the art. In certain aspects, the asphaltene inhibitor can be selected from aliphatic sulphonic acids; alkyl aryl sulphonic acids; aryl sulfonates; lignosulfonates; alkylphenol resins; aldehyde resins; sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, polyisobutylene succinic anhydride, nonylphenol formaldehyde, nonylphenol formaldehyde resin, fatty acid amine condensate, or any combinations thereof. Commercially available asphaltene inhibitor can be used includes but are not limited to FLOTREAT DF 267 from Clariant, FLOTREAT DF 15980 from Clariant, FATHOM XT SUBSEA525 from Baker Hughes, ASPH16507A from NALCO Champion and ASI 1262 from Total Additives. In certain aspects, one or more asphaltene inhibitor can be excluded.

3. Surface Modifying Agent

In certain aspects, the nanoparticles of the invention can have a surface modifying agent impregnated within the nanoparticle, and/or bound or otherwise adhered on the surface of the nanoparticle. In certain aspects, the surface modifying agent can be bound or otherwise adhered on the surface of the nanoparticle. In some aspects, the nanoparticles can have surface modifying agent bound or otherwise adhered to at least a portion of the outer surface of the nanoparticle. The weight ratio of the nanoparticle (e.g. without the surface modifying agent) and the surface modifying agent can be 95:5 to 60:40, or equal to any one of, at least any one of, or between any two of 95:5, 90:10, 85:15, 80:20, 75:25, 70:30, 65:35, 60:40, 55:45 and 50:50. The surface modifying agent can be a non-ionic surfactant, an anionic surfactant, a cationic surfactant, an amphoteric surfactant, a zwitterionic surfactant, a block co-polymer, an organic compound, or any combinations thereof. In certain aspects, the surface modifying agent is sorbitan monooleate, sodium dodecylbenzene sulfonate, cetylpyridinium chloride, benzyldimethylhexadecyl-ammonium chloride, bis(2-ethylhexyl)phosphate, cetrimonium chloride, cetrimonium bromide, 3-aminopropyltriethoxysilane, n-octadecyltrimethoxysilane or any combinations thereof. In certain aspects, the polymer, such as polyethylene, such as oxidized polyethylene containing nanoparticle of the invention can contain a surface modifying agent selected from sorbitan monooleate, sodium dodecylbenzene sulfonate, cetylpyridinium chloride, benzyldimethylhexadecyl-ammonium chloride, bis(2-ethylhexyl)phosphate, or any combinations thereof, wherein the surface modifying agent can be bound or otherwise adhered on the surface of the nanoparticle. In certain aspects, the silica containing core-shell nanoparticle of the invention can contain a surface modifying agent selected from 3-aminopropyltriethoxysilane and/or n-octadecyltrimethoxysilane, preferably 3-aminopropyltriethoxysilane wherein the surface modifying agent can be bound or otherwise adhered on the surface of the nanoparticle.

4. Surface Active Agent

In certain aspects, the silica containing core-shell nanoparticle of the invention can contain a surface active agent. The surface active agent can be positioned in the core of the core-shell nanoparticle. In certain aspects, the surface active agent can be a cationic surfactant. In certain aspects, the cationic surfactant can be cetrimonium chloride and/or cetrimonium bromide, preferably cetrimonium bromide. In some aspects, 0 to 10 wt. %, or equal to any one of, at least any one of, or between any two of 0, 0.2, 0.5, 1, 2, 3, 4, 5, 6, 7, 8, 9 and 10 wt. % of the core 402, based on the total weight of the core 402, can be comprised of the surface active agent.

B. Methods of Making Nanoparticles

The nanoparticles of the present invention can be prepared by contacting the asphaltene inhibitor with the carrier material. The carrier material can be a suitable form that can be contacted with the asphaltene inhibitor. In certain aspects, carrier material containing unloaded nanoparticles, e.g., nanoparticles without asphaltene inhibitor, can be contacted with the asphaltene inhibitor to form the nanoparticles of the present invention. In certain aspects, the carrier material can be in a melted form that can be contacted with the asphaltene inhibitor to form the nanoparticles of the present invention. The melted carrier material and asphaltene inhibitor combination can then be used to form nanoparticles and can be cooled. In certain aspects, precursor material of the carrier material can be contacted with the asphaltene inhibitor to form the nanoparticles of the present invention.

1. Methods of Making Nanoparticles Containing Polymer Matrix

In certain aspects, the carrier material can contain polymer matrix, and the method of making the nanoparticles can include contacting the polymer with the asphaltene inhibitor at a temperature above the melting point of the polymer. In certain aspects, the melted polymer and the asphaltene inhibitor can form an emulsion containing the polymer and the asphaltene inhibitor, and the emulsion can be cooled to form a nanoparticle containing the polymer and asphaltene inhibitor. The emulsion can be formed by contacting the melted polymer and the asphaltene inhibitor with an immiscible solvent. In the emulsion, the continuous phase can be the immiscible solvent, and the discontinuous droplet phase can include the polymer and the asphaltene inhibitor. The polymer and the asphaltene inhibitor can be premixed and can be contacted with the immiscible solvent, or can be separately contacted with the immiscible solvent and mixed to form the emulsion. The polymer and the asphaltene inhibitor can be heated to a temperature above the melting point of the polymer prior and/or after contacting with the immiscible solvent. In some particular aspects, a high temperature pre-formed mixture containing the polymer and asphaltene inhibitor having a temperature above the melting point of the polymer can be contacted with the immiscible solvent to form the emulsion. The polymer and/or the asphaltene inhibitor can be heated to temperatures above the melting point of the polymer before, during and/or after contacting with each other. In some particular aspects, the high temperature pre-formed mixture can be formed by contacting the polymer and asphaltene inhibitor to form a pre-formed mixture, and heating the pre-formed mixture to form the high temperature pre-formed mixture. In some particular aspects, the high temperature pre-formed mixture can be formed by melting the polymer to form a polymer melt, and contacting the polymer melt with the asphaltene inhibitor to form the high temperature pre-formed mixture. In certain aspects, the method can further include contacting a surface modifying agent with the immiscible solvent. The surface modifying agent can be contacted with the immiscible solvent, before, during and/or after contacting the immiscible solvent with the polymer, and/or the asphaltene inhibitor. In certain aspects, the pre-formed mixture and/or the high temperature pre-formed mixture can contain the surface modifying agent and the surface modifying agent can be contacted with the immiscible solvent, with the pre-formed mixture, and/or the high temperature pre-formed mixture. Without wishing to be bound by theory, it is believed that the surface modifying agent can get adsorbed, or otherwise adhered to the surface of the discontinuous droplet phase, and can control the emulsion droplet formation, size of the nanoparticles formed, and stabilize the synthesized nanoparticle. In certain aspects, the surface modifying agent can be non-ionic surfactant, an anionic surfactant, a cationic surfactant, an amphoteric surfactant, a zwitterionic surfactant, a block co-polymer, an organic compound, or any combinations thereof. In certain aspects, the surface modifying agent can be sorbitan monooleate, sodium dodecylbenzene sulfonate, cetylpyridinium chloride, benzyldimethylhexadecyl-ammonium chloride, bis(2-ethylhexyl)phosphate, or any combinations thereof. The immiscible solvent used can be immiscible with the polymer and the asphaltene inhibitor. In certain aspects, the immiscible solvent can be water, acetic acid, butanol, ethylene glycol, acetyl acetone, or any combinations thereof. In some particular aspects, the immiscible solvent can be water. In some aspects, the emulsion can be oil-in-water emulsion. In certain aspects, the weight ratio of the polymer and the asphaltene inhibitor used can be 9:1 to 1:9, or equal to any one of, at least any one of, or between any two of 1:9, 2:8, 3:7, 4:6, 5:5, 6:4, 7:3, 8:2, and 9:1. In certain aspects, the weight ratio of the polymer and the surface modifying agent used can be 1:0.05 to 1:4 or equal to any one of, at least any one of, or between any two of 1:0.05, 1:0.1, 1:0.2, 1:0.5, 1:1, 1:1.5, 1:2, 1:3, and 1:4.

In certain aspects, the polymer can be polyolefin, paraffin wax, fatty glyceride, polyacrylamide, polystyrene, epoxide, polyester or any combinations thereof. In some aspects, the polymer can have a melting point of 30° C. to 300° C. In certain aspects, the polymer can be polyolefin. In some aspects, the polyolefin can be polyethylene. In certain aspects, the polyethylene can be oxidized polyethylene. In some particular aspects, the polyethylene, such as oxidized polyethylene can have a weight average molecular weight (Mw) of 2000 g/mol. to 20000 g/mol and/or a melting point of 30° C. to 300° C., preferably 50° C. to 200° C.

2. Methods of Making Core-Shell Nanoparticles Containing Silica Matrix

The core-shell nanoparticles containing a core containing asphaltene inhibitor and a shell containing silica can be prepared by contacting the asphaltene inhibitor with a silica precursor. In certain aspects, the asphaltene inhibitor and the silica precursor can be contacted by adding the asphaltene inhibitor and the silica precursor to a solution. The asphaltene inhibitor and the silica precursor can be added to the solution at any suitable order, e.g. separately, or together. In some particular aspects, a solution containing the asphaltene inhibitor can be contacted with the silica precursor. The silica precursor can form silica, such as porous silica, such as open celled porous silica in the solution. In certain aspects, the silica precursor can be a silicon alkoxide. In certain aspects, the silicon alkoxide can be propyl trimethoxysilane. In certain aspects, the solution can contain water. In some particular aspects, the solution can contain water and ethanol at a molar ratio of 7.8:0.1 to 7.8:4, or equal to any one of, at least any one of, or between any two of 7.8:0.1, 7.8:0.5, 7.8:1, 7.8:2, 7.8:3, and 7.8:4. In certain aspects, the solution can be heated to a temperature of 50° C. to 90° C., or equal to any one of, at least any one of, or between any two of 50, 55, 60, 65, 70, 75, 80, 85 and 90° C., before, during and/or after addition of the asphaltene inhibitor and/or the silica precursor. In certain aspects, the method can further include contacting a catalyst with the solution. The catalyst can catalyze formation of the silica from the silica precursor. The catalyst can be contacted with the solution before, during and/or after contacting the silica precursor with the solution. In certain aspects, the catalyst can be triethanolamine and/or ammonium hydroxide, preferably triethanolamine. In certain aspects, the pH of the solution after addition of the catalyst can be 6 to 11 or equal to any one of, or between any two of 6, 7, 8, 9, 10 and 11. In certain aspects, the method can further include adding a surface active agent to the solution. The surface active agent can be contacted with the solution before, during and/or after contacting the silica precursor with the solution. In some aspects, the surface active agent can be a cationic surfactant. In some particular aspects, the cationic surfactant can be a cetyltrimethylammonium halide, such as cetyltrimethylammonium chloride and/or cetyltrimethylammonium bromide, preferably cetyltrimethylammonium bromide. Without wishing to be bound by theory, it is believed that the cationic surfactant can hold the asphaltene inhibitors inside the core and can also help in formation of the mesoporosity in the silica. After formation of the core-shell nanoparticles, large particles can be separated, e.g., filtered from the solution to prevent formation damage. In some aspects, before filtration, a surface modifying agent can be added to the reaction mixture. Without wishing to be bound by theory it is believed that the surface modifying agent can impart some hydrophobicity in the surface of mesoporous silica nanoparticles (e.g., by binding to the surface of the silica nanoparticle surface), which can help in making a stable nanoparticle solution in non-polar solvents. In some particular aspects, the surface modifying agent can be an alkyl siloxane with long alkyl chain. In some particular aspects, the surface modifying agent can be (3-Aminopropyl)triethoxysilane (APTES). In some aspects, nanoparticles can be filtered, with a 0.3 to 0.6 μm, such as about 0.45 μm filter. In certain aspects, the method of formation of the core-shell nanoparticles can also (e.g., in addition to the core-shell nanoparticles) form spherical mesoporous silica nanoparticles (e.g., without core-shell structure) containing the asphaltene inhibitors loaded in the pores and/or otherwise complexed with the silica.

C. Subterranean Well Treatment Compositions

The nanoparticles of the present invention can be provided to a treatment site as individual nanoparticles or as a subterranean treatment composition (e.g., a subterranean well treatment composition). By way of example, a subterranean well treatment composition can include a fluid (e.g., an aqueous and/or organic liquid) that contains a plurality of the nanoparticles (e.g., a slurry and/or dispersion) containing the asphaltene inhibitor. The composition can be a controlled-release composition capable of releasing the asphaltene inhibitor over an extended period of time. These compositions can be prepared by mixing the nanoparticles of the invention with a fluid that will be injected into the well. Non-limiting examples of a subterranean treatment composition fluid include water, salt water (KCl) an acidic aqueous solution, low sulfate seawater, an aqueous sodium carbonate solution, a surfactant, or other flush fluid, or can be an organic solvent/fluid (e.g., based on oil, natural gas or petroleum based fluids), or can be a combination of organic and aqueous fluids. In certain aspects, the fluid can contain an organic solvent containing aromatic hydrocarbons, such as $C_6$-$C_{15}$ aromatic hydrocarbons. In certain aspects, the organic solvent can contain toluene, xylene, $C_9$ aromatic hydrocarbons, $C_{10}$ aromatic hydrocarbons, or any combinations thereof. Commercially available organic solvent that can be used includes but are not limited to SHELLSOL A150, sold by Shell chemicals.

D. Methods of Treating Subterranean Wells or Wellbores

The nanoparticles or nanoparticle composition (e.g., subterranean treatment composition) of the invention can be delivered to the subterranean formation using a variety of methods, pumping, pressuring injection, or the like. In some embodiments, a squeeze or continuous treatment method is used. In some preferred aspects, a squeeze treatment can be used. A method of treating a subterranean formation, well, or wellbore is depicted in FIG. 5. In addition to treating wells, the nanoparticles can be used to deliver additives to the subterranean formation for other purposes (e.g., deliver mud additives to drilling fluids or enhanced oil recovery fluids, or the like). Wells 502 can intersect the subterranean formation, and can be injection wells, production wells, water wells, or the like. As shown, the wells 502 intersect as vertical wells, but can be horizontal wells. Wells 502 can be uncased wellbores, cased wellbores or the like. In method 500, prior to production from well 502, the nanoparticles or composition of the present invention can be injected into one or more wells 502, flow through the well and into subterranean formation 504 as shown by arrow 508. The nanoparticles 510 can be deposited on rock formation 506 in the subterranean formation. Known drilling equipment (e.g., oil, gas, or water drilling equipment) can be used to inject the subterranean well treatment compositions into wells 502 (e.g., using a squeeze method, continuous method, or spear method). The nanoparticles can be retained in the formation rock 506 and the asphaltene inhibitor of the nanoparticle can be returned to the well 502 in an amount effective to perform the necessary function (e.g., inhibit asphaltene precipitation) when the well is put into production. As shown in FIG. 5, fluid can flow over the rock as shown by arrow 512 and dissolve or desorb a small amount of asphaltene inhibitor from the nanoparticle. The formation fluid containing the asphaltene inhibitor then flows into the well. The asphaltene inhibitor can coat or interact with the well materials or fluid in the well to treat the well (e.g., inhibit asphaltene agglomeration and/or precipitation). By way of example, the asphaltene inhibitor can inhibit and/or reduce asphaltene precipitation from forming on the inside portion of the wall of well 502, and/or inhibit inside the formation. The nanoparticles, and/or composition containing the nanoparticle of the present inventions allows an effective amount of asphaltene inhibitor to be released from the nanoparticle over an extended period of time (e.g., at least for 10, 20, 30, 40, 50, 60, 70, 80, 90, 100, 200, 300, 400, 500, 1,000, 2,000, 3,000, or 4,000, days or more, or from 10 days to 500 days, or from 20 days to 365 days, or from 500 days to 2500 days, or from 500 days to 2000 days, or from 10 days to 10 years after well treatment).

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Preparation of Nanoparticles Containing Asphaltene Inhibitor and Oxidized Polyethylene Materials: Oxidized PE: EPOLENE E-14 from Westlake Chemicals; Asphaltene inhibitor: CLARIANT RP 19-1301 from Clariant; Anionic Surfactant: Sodium dodecylbenzenesulfonate; Cationic Surfactant: Benzyldimethylhexadecycl-ammonium chloride.

Figures 6A, 6B:
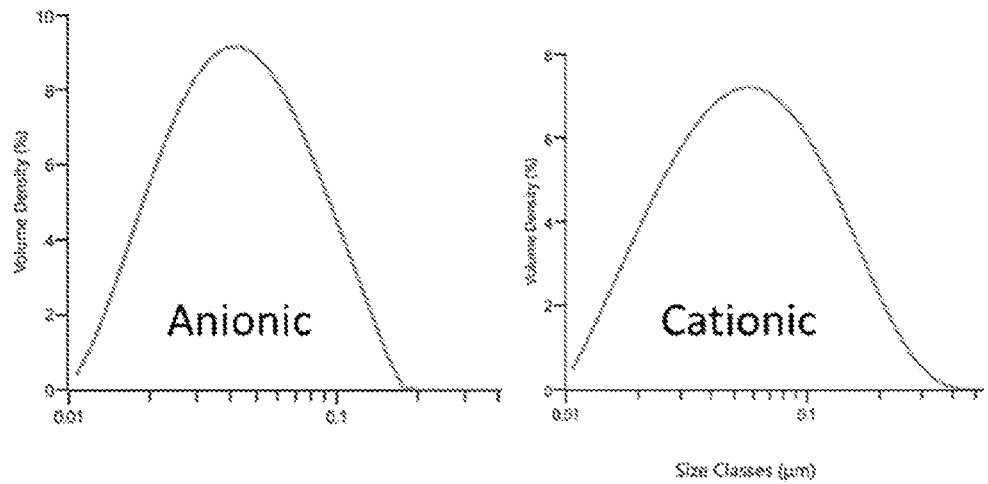
FIGS. 6A, 6B, 6C, and 6D are particle size distributions for asphaltene inhibitor and polyethylene containing nanoparticles as prepared in Example 1, using anionic surfactant (FIG. 6A), and cationic surfactant (FIG. 6B). SEM image of the nanoparticles as prepared in Example 1 using anionic surfactant (FIG. 6C), and cationic surfactant (FIG. 6D).
Figures 6C, 6D:
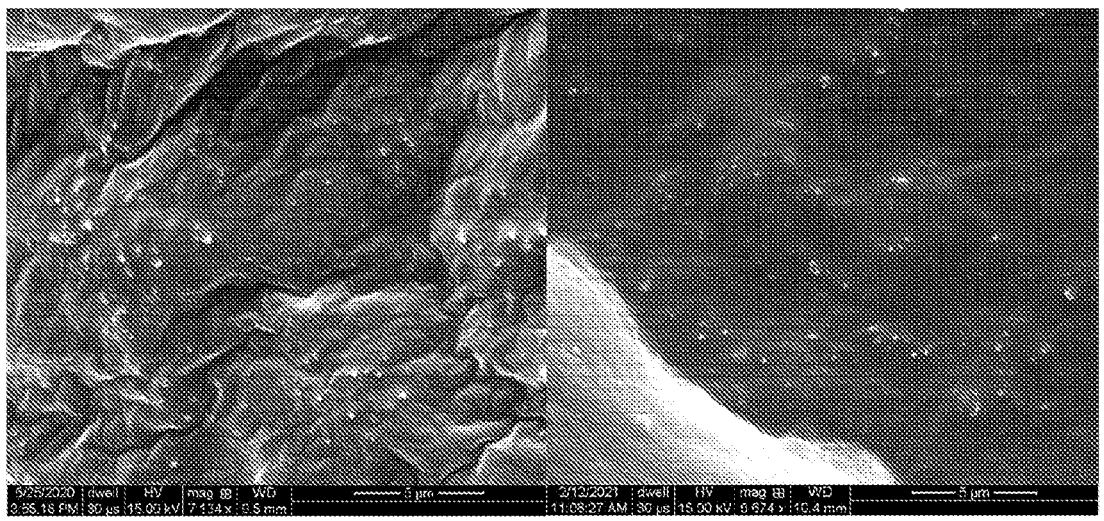

Methods: Water at 100° C. was added to a mixture containing an oxidized polyethylene, an asphaltene inhibitor, and an anionic surfactant, and having a temperature of 150° C. After addition, the water containing the oxidized polyethylene, asphaltene inhibitor, and surfactant was stirred at 1500 rpm for 10 minutes, and was then sonicated for 30 seconds, to form oil-in-water emulsions containing the oxidized polyethylene and asphaltene inhibitor. The oil-in-water emulsion was then cooled to 4° C. in a refrigerator to form nanoparticles containing the oxidized polyethylene and asphaltene inhibitor. In a similar experiment a cationic surfactant instead of the anionic surfactant was used. Size distributions of the nanoparticles obtained in the experiments are shown in FIG. 6A (obtained using anionic surfactant), and B (obtained using cationic surfactant)). SEM image of the nanoparticles obtained in the experiments are shown in FIG. 6C (obtained using anionic surfactant), and D (obtained using cationic surfactant).

Example 2

Core-Shell Nanoparticles Containing Asphaltene Inhibitor and Mesoporous Silica

Figure 7A:
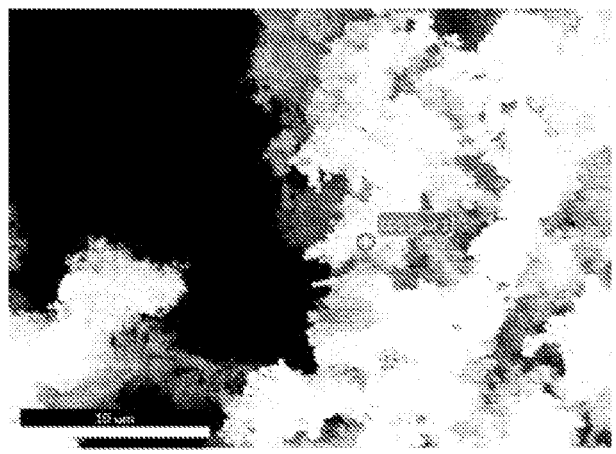
FIG. 7A and FIG. 7B are SEM and TEM images, respectively, of mesoporous silica particles as prepared in Example 2, showing spherical particle morphology and 200-400 nm particle size. Mesoporous pore size ranges from 2 nm to 50 nm.
Figure 7B:
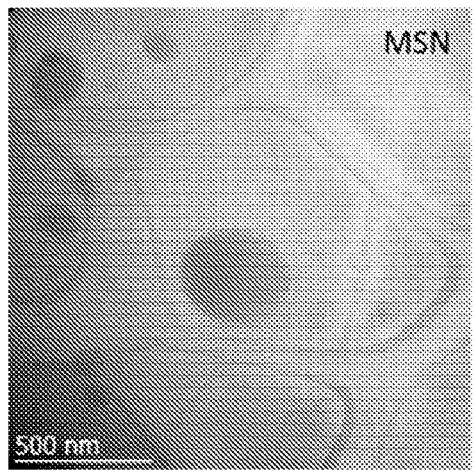
Figure 8A:
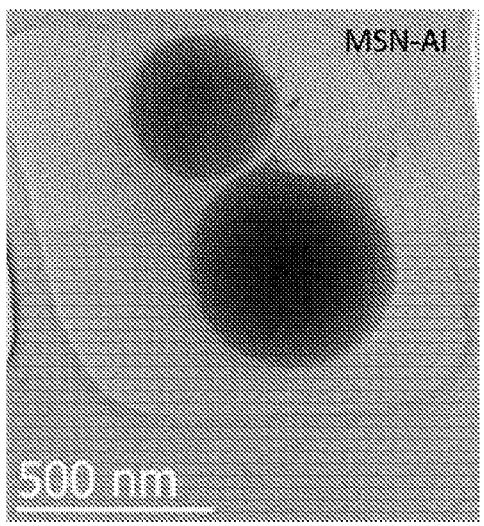
FIGS. 8A and 8B are TEM images of an asphaltene inhibitor and mesoporous silica containing nanoparticles.
Figure 8B:
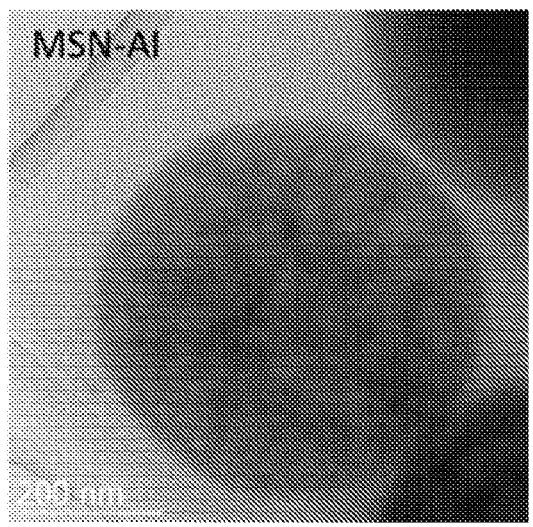

Cetrimonium bromide was added to a solution containing water and ethanol (at molar ratio 7.8:1) at 70° C. with vigorous stirring. Propyl trimethoxysilane, triethanolamine, and an asphaltene inhibitor (CLARIANT RP 19-1301 from Clariant) were added to the solution with vigorous stirring. The pH of the solution after addition of triethanolamine was 7.5 to 10. After 10-60 minutes of stirring (3-aminopropl) triethoxysilane (APTES) was added to the solution mixture. Nanoparticles having core-shell structure with an asphaltene inhibitor containing core and mesoporous silica containing shell, which are surface functionalized with APTES were formed The synthesized product was filtered using a 0.45 µm filter to prevent formation damage. The method also produces spherical mesoporous silica nanoparticles (e.g. without core-shell structure) containing asphaltene inhibitor loaded into the pores and/or otherwise complexed with the silica. FIG. 7 shows SEM (A) and TEM (B) image of mesoporous silica particles as prepared, showing spherical particle morphology and 200-400 nm particle size. FIG. 8A shows mesoporous silica shell and asphaltene inhibitor core morphology, and FIG. 8B shows porous nature of the core-shell nanoparticles.

The invention claimed is:

1. A nanoparticle comprising a carrier material and an asphaltene inhibitor, wherein the asphaltene inhibitor is releasable from the carrier material,
   wherein the nanoparticle has a core-shell structure comprising the asphaltene inhibitor and a porous shell comprising the carrier material,
   wherein the nanoparticle has a diameter of 250 nm to 350 nm, the thickness of the shell is 50 nm to 150 nm, and at least 90 wt. % of the core, based on the total weight of the core, comprises the asphaltene inhibitor, and
   wherein the shell comprises the asphaltene inhibitor on at least a portion of the shell surface and in the pores of the shell.

2. The nanoparticle of claim 1, having a size of 50 nm to 400 nm.

3. The nanoparticle of claim 2, wherein the nanoparticle comprises 20 wt. % to 80 wt. %, of the asphaltene inhibitor.

4. The nanoparticle of claim 1, wherein the asphaltene inhibitor is physically entrapped within the carrier material and/or bound to the carrier material through an ionic bond, a covalent bond, a hydrogen bond, a van der Waals interaction or by adsorption onto a surface of the carrier material.

5. The nanoparticle of claim 4, wherein the asphaltene inhibitor is adsorbed onto the surface of the carrier material.

6. The nanoparticle of claim 1, wherein at least a portion of the surface of the nanoparticle comprises a surface modifying agent.

7. The nanoparticle of claim 1, wherein the carrier material is a silica matrix.

8. The nanoparticle of claim 7, wherein the silica matrix is an open-celled porous silica matrix having an average pore size of 2 nm to 50 nm.

9. The nanoparticle of claim 8, wherein at least a portion of the asphaltene inhibitor is comprised in the pores of the porous silica matrix.

10. The nanoparticle of claim 1, wherein the carrier material is a silica matrix, and a surface modifying agent is 3-aminopropyltriethoxysilane, and the nanoparticle further comprises a cationic surfactant comprising cetyltrimethylammonium bromide (CTAB).

11. The nanoparticle of claim 1, wherein the carrier material is a polymer matrix.

12. The nanoparticle of claim 11, wherein the polymer matrix comprises a polyolefin.

13. The nanoparticle of claim 12, wherein the polyolefin is a polyethylene.

14. The nanoparticle of claim 13, wherein the polymer matrix has a melting point of 50° C. to 200° C.

15. The nanoparticle of claim 1, wherein the asphaltene inhibitor is capable of being released from the nanoparticle over an extended period of time.

16. A well treatment composition comprising a plurality of the nanoparticles of claim 1.

17. The well treatment composition of claim 16, wherein the well-treatment composition comprises 2000 kg to 50000 kg of the nanoparticles, and is capable of treating subterranean formations and/or wells for 300000 barrels to 8000000 barrels of oil produced.

18. The well treatment composition of claim 16, further comprising water, a surfactant, or an organic solvent, or any combinations thereof.

19. A method of treating a subterranean formation or a wellbore, the method comprising injecting the composition of claim 16 into the wellbore, the wellbore intersecting the subterranean formation.

* * * * *